US012739629B2

(12) United States Patent
Xing et al.

(10) Patent No.: US 12,739,629 B2

(45) Date of Patent: Sep. 15, 2026

(54) HOME TRIGGERED PRIMARY AUTHENTICATION FOR INTER-WORKING NETWORKS

(71) Applicant: ZTE Corporation, Shenzhen (CN)

(72) Inventors: Zhen Xing, Shenzhen (CN); Shilin You, Shenzhen (CN); Yuze Liu, Shenzhen (CN); Zhaoji Lin, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 277 days.

(21) Appl. No.: 18/647,527

(22) Filed: Apr. 26, 2024

(65) Prior Publication Data

US 2024/0284173 A1 Aug. 22, 2024

Related U.S. Application Data

(63) Continuation of application No. PCT/CN2022/098458, filed on Jun. 13, 2022.

(51) Int. Cl.

| | |
|---|---|
| ***H04W 12/06*** | (2021.01) |
| ***H04W 12/041*** | (2021.01) |
| ***H04W 60/04*** | (2009.01) |

(52) U.S. Cl.

CPC ......... *H04W 12/06* (2013.01); *H04W 12/041* (2021.01); *H04W 60/04* (2013.01)

(58) Field of Classification Search

CPC ... H04W 12/06; H04W 12/041; H04W 60/04; H04W 8/20; H04W 12/069

See application file for complete search history.

(56) References Cited

U.S. PATENT DOCUMENTS

2011/0314287 A1 12/2011 Escott et al.
2019/0098502 A1* 3/2019 Torvinen ........... H04W 12/0433

(Continued)

FOREIGN PATENT DOCUMENTS

CN 110574449 A 12/2019
CN 112105021 A 12/2020

(Continued)

OTHER PUBLICATIONS

International Search Report and Written Opinion for International Application No. PCT/CN2022/098458 mailed Dec. 16, 2022 (6 pages).

(Continued)

*Primary Examiner* — Brandon J Miller

(74) *Attorney, Agent, or Firm* — Crowell & Moring LLP

(57) ABSTRACT

A primary authentication procedure is triggered to derive an authentication key for a home network. The authentication key may be used for interworking between network types. For example, a home network primary authentication mechanism may be triggered for interworking from Evolved Packet System (EPS) to 5GS. When a user equipment (UE) moves between network types, the security context and authentication may be different or incompatible. For example, an authentication key may be missing, which may be needed for authentication in one of the network types. Authentication key support may be determined and registration/authentication may vary based on that support. When there is no support for the authentication key, a reauthentication process may be performed.

20 Claims, 11 Drawing Sheets

(56) References Cited

U.S. PATENT DOCUMENTS

| | | | | |
|---|---|---|---|---|
| 2020/0037165 | A1* | 1/2020 | Kunz | H04W 12/106 |
| 2020/0344604 | A1 | 10/2020 | He et al. | |
| 2021/0274346 | A1 | 9/2021 | Suh et al. | |
| 2021/0329583 | A1* | 10/2021 | Baek | H04W 48/18 |
| 2025/0184729 | A1* | 6/2025 | Baskaran | H04L 9/3228 |

FOREIGN PATENT DOCUMENTS

| | | | | |
|---|---|---|---|---|
| RU | 2 708 951 | C2 | 12/2019 | |
| WO | WO 2020/201051 | A1 | 10/2020 | |
| WO | WO-2021094109 | A1 * | 5/2021 | H04W 12/06 |
| WO | WO 2021/201655 | A1 | 10/2021 | |
| WO | WO 2022080388 | A1 | 4/2022 | |

OTHER PUBLICATIONS

3GPP. “TSG SSA: Security Architecture and Procedures for 5G System (Release 15)” *3GPP TS* 33.501 VO.5.0, Sections 6.1-6.2; May 2019 (191 pages).

3GPP “Technical Specification Group Services and System Aspects; Study on home network triggered primary authentication (Hontra); (Release 18)” SGPP TR 33.741 v01.0 (May 2022), (10 pages).

Extended European Search Report issued in European Patent Application No. 22946112.4 dated Jul. 1, 2025, 7 pages.

Russian Office Action and Search Report issued in Application No. 2024111376 dated Oct. 24, 2025, including English translation (12 pages).

3rd Generation Partnership Project; Technical Specification Group Services and System Aspects; System architecture for the 5G System (5GS); Stage 2 (Release 17), 3GPP TS 23.501 V17.4.0, Mar. 2022 (567 pages).

* cited by examiner 100
104
104
102
102
Basestation
102
Core Network
110
System Circuitry
122
Tx / Rx Circuitry
113
2G / 3G / 4G / LTE / 5G
Network Interface Circuitry
116
Processor(s)
124
Memory
126
Control parameters
130
Operations
128

200
104
19
25
Chicago
Blizzard
Feb 1, 2014
30°
System
Power
282
Battery
254
RACH / DCI
252
102
Communication Interfaces
212
Tx / Rx Circuitry
BT / WLAN / NFC
2G / 3G / 4G / LTE / 5G
230
Antenna(s)
232
System Circuitry
214
Input / Output
228
SIM Card 1 Interface
206
202
210
Processor(s)
216
Memory
220
Control Instructions
222
Control Parameters
224
User Interface
218
GUI Application Function or Network Exposure Function
316
Data Network
318
308
Policy Control Function
314
N7
Session Management Function
N4
User Plane Function
310
N6
Unified Data Managment
312
N10
N11
Access and Mobility Management Function
306
N8
N2
NG-RAN (Basestation)
304
N1
User Equipment
302

HOME TRIGGERED PRIMARY AUTHENTICATION FOR INTER-WORKING NETWORKS

CROSS-REFERENCE TO RELATED APPLICATIONS

This application is a continuation of co-pending International Patent Application No. PCT/CN2022/098458, filed Jun. 13, 2022. The contents of International Patent Application No. PCT/CN2022/098458 are herein incorporated by reference in their entirety.

TECHNICAL FIELD

This document is directed generally to wireless communications. More specifically, an authentication mechanism is provided for interworking between different network types.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. In order to improve communications and meet reliability requirements for the vertical industry as well as support the new generation network service, improvements should be made to maintain and ensure the quality of service standards.

SUMMARY

This document relates to methods, systems, and devices for a home network triggered primary authentication mechanism. A primary authentication procedure is triggered to derive an authentication key for a home network. The authentication key may be used for interworking between network types. For example, a home network primary authentication mechanism may be triggered for interworking from Evolved Packet System (EPS) to 5GS. When a user equipment (UE) moves between network types (e.g. Evolved Packet System (EPS) to 5GS), the security context and authentication may be different or incompatible. For example, an authentication key may be missing, which may be needed for authentication in one of the network types. Authentication key support may be determined and registration/authentication may vary based on that support. When there is no support for the authentication key, a reauthentication process may be performed.

An authentication mechanism is provided for interworking between different network types. Although the interworking between network types is described as between different generations of networks (e.g. 4G to 5G), this is merely one example of network types. During a registration procedure, Unified Data Management (UDM) checks its condition and then indicates the AMF to trigger the authentication. When the UE moves from Evolved Packet System (EPS) to 5GS, Access and Mobility Management Function (AMF) may use the mapped 5G security context constructed from the EPS security context to protect the subsequent messages, which does not include the authentication key (e.g. $K_{AUSF}$ key). All other keys may be derived from this key, but when UE moves from 4G to 5G, this key is missing, so interworking may not work. This authentication key may only be generated in a 5G network, so the primary authentication procedure may need to be triggered to derive this key. A home network triggered primary authentication mechanism for interworking is described herein.

In one embodiment, a wireless communication method includes receiving registration request; determining, after receiving the registration request, support of an authentication key for home network services; continuing registration when the determining includes the support for the authentication key; and initiating reauthentication when determining that there is not support for the authentication key. The registration request is from an access and mobility management function (AMF) to a Unified Data Management (UDM). The UDM performs the determining. The method further includes responding, by the UDM to the AMF, to the registration request after the determining. The method further includes storing, by the UDM, an Authentication Server Function (AUSF) instance upon successful authentication. When the determining includes no support for the authentication key, the method further includes responding with error information before the initiating the reauthentication. The determining support of an authentication key for home network services, further includes determining support for the home network services need an authentication key; and determining whether there is a routing indicator which is used to find an NF instance, which store the authentication key, such as Authentication Server Function (AUSF) instance identification (ID). The authentication key comprises an Authentication Server Function (AUSF) key KAUSF. The method further includes completing authentication between a user equipment (UE) for new radio (NR) security.

In another embodiment, a wireless communication method includes retrieving registration information; determining, after the retrieving and based on the registration information, support of an authentication key for home network services; initiating registration when the determining includes the support for the authentication key; and initiating reauthentication when determining that there is not support for the authentication key. The retrieving is from an access and mobility management function (AMF) with a Unified Data Management (UDM). The UDM performs the determining. The method further includes responding, by the UDM to the AMF, to the triggering after the determining. The method further includes storing, by the UDM, an Authentication Server Function (AUSF) instance upon successful authentication. The registration information comprises Access and Mobility Subscription data. When the determining includes no support for the authentication key, the method further includes responding with error information before the initiating the reauthentication. The determining support of an authentication key for home network services, further includes determining support for the home network services; and determining whether there is an Authentication Server Function (AUSF) instance. The authentication key comprises an Authentication Server Function (AUSF) key KAUSF. The method further includes completing authentication between a user equipment (UE) for new radio (NR) security.

In another embodiment, a wireless communication method includes subscribing to registration information; determining, after the subscribing and based on the registration information, support of an authentication key for home network services; initiating registration when the determining includes the support for the authentication key; and initiating reauthentication when determining that there is not support for the authentication key. The registration information comprises Access and Mobility Subscription data for the subscribing. The subscribing is from an access and mobility management function (AMF) with a Unified Data Management (UDM). The UDM performs the determining. The method further includes storing, by the UDM, an Authentication Server Function (AUSF) instance upon successful authentication. When the determining includes no support for the authentication key, the method further includes responding with error information before the initiating the reauthentication. The determining support of an authentication key for home network services, further includes determining support for the home network services; and determining whether there is an Authentication Server Function (AUSF) instance. The authentication key includes an Authentication Server Function (AUSF) key KAUSF.

In another embodiment, a wireless communications apparatus comprising a processor and a memory, wherein the processor is configured to read code from the memory and implement any of the methods for wireless communication described herein.

In another embodiment, a computer program product comprising a computer-readable program medium code stored thereupon, the code, when executed by a processor, causing the processor to implement any of the methods for wireless communication described herein.

DETAILED DESCRIPTION

Figure 1:
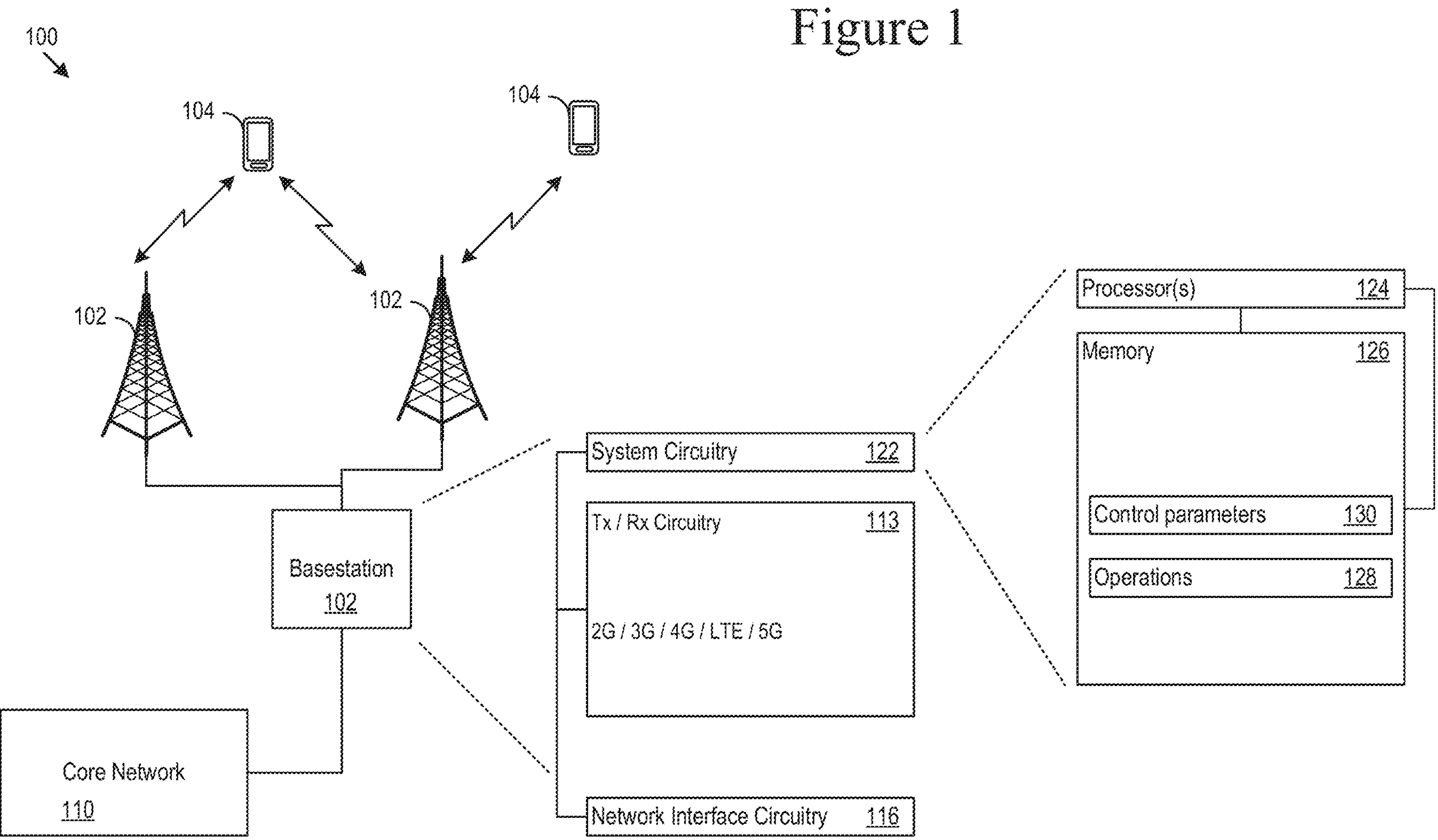
FIG. 1 shows an example basestation.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Radio resource control ("RRC") is a protocol layer between UE and the basestation at the IP level (Network Layer). There may be various Radio Resource Control (RRC) states, such as RRC connected (RRC_CONNECTED), RRC inactive (RRC_INACTIVE), and RRC idle (RRC_IDLE) state. RRC messages are transported via the Packet Data Convergence Protocol ("PDCP"). As described, UE can transmit data through a Random Access Channel ("RACH") protocol scheme or a Configured Grant ("CG") scheme. CG may be used to reduce the waste of periodically allocated resources by enabling multiple devices to share periodic resources. The basestation or node may assign CG resources to eliminate packet transmission delay and to increase a utilization ratio of allocated periodic radio resources. The CG scheme is merely one example of a protocol scheme for communications and other examples, including but not limited to RACH, are possible. The wireless communications described herein may be through radio access.

Figure 2:
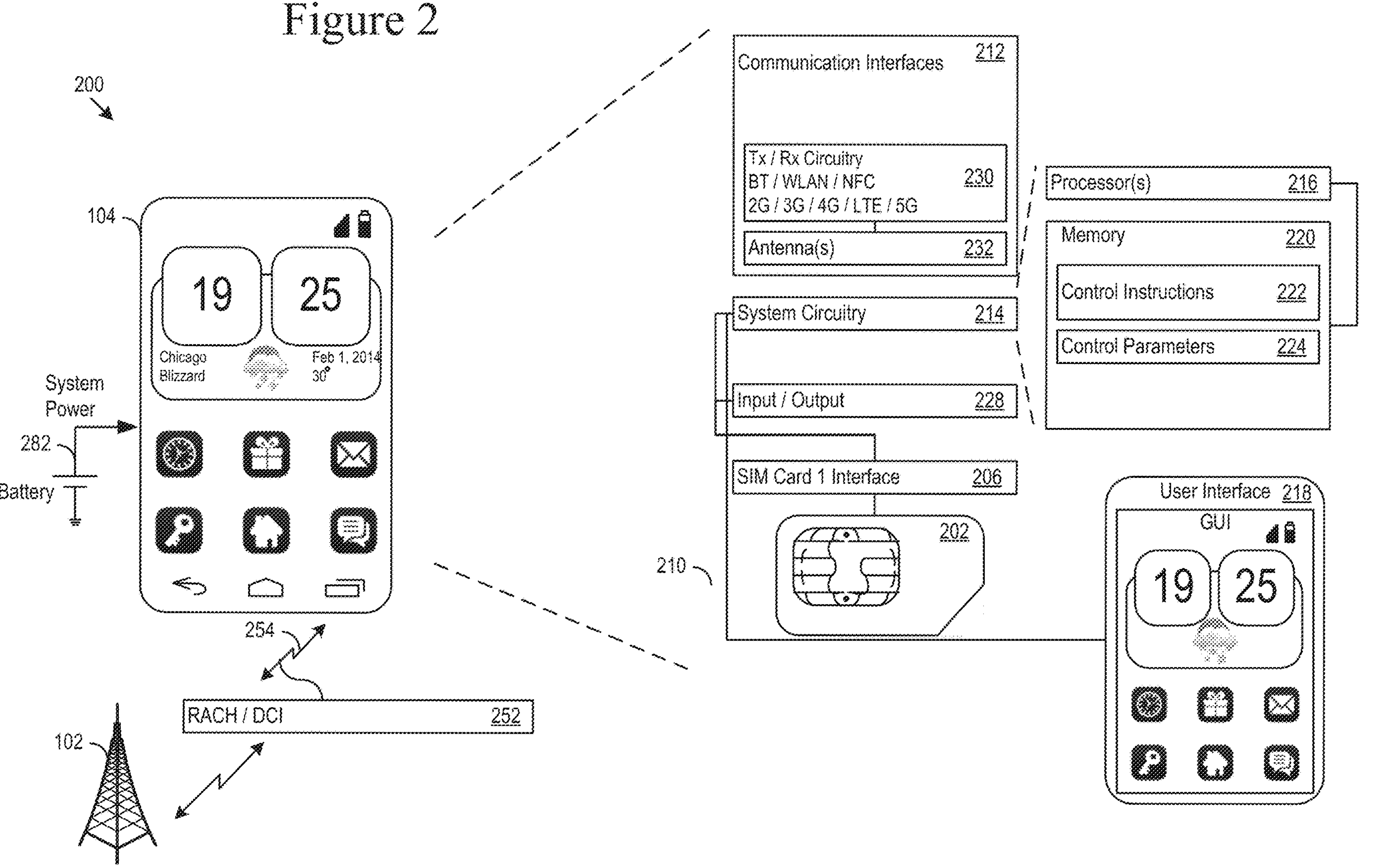
FIG. 2 shows an example random access (RA) messaging environment.
Figure 3:
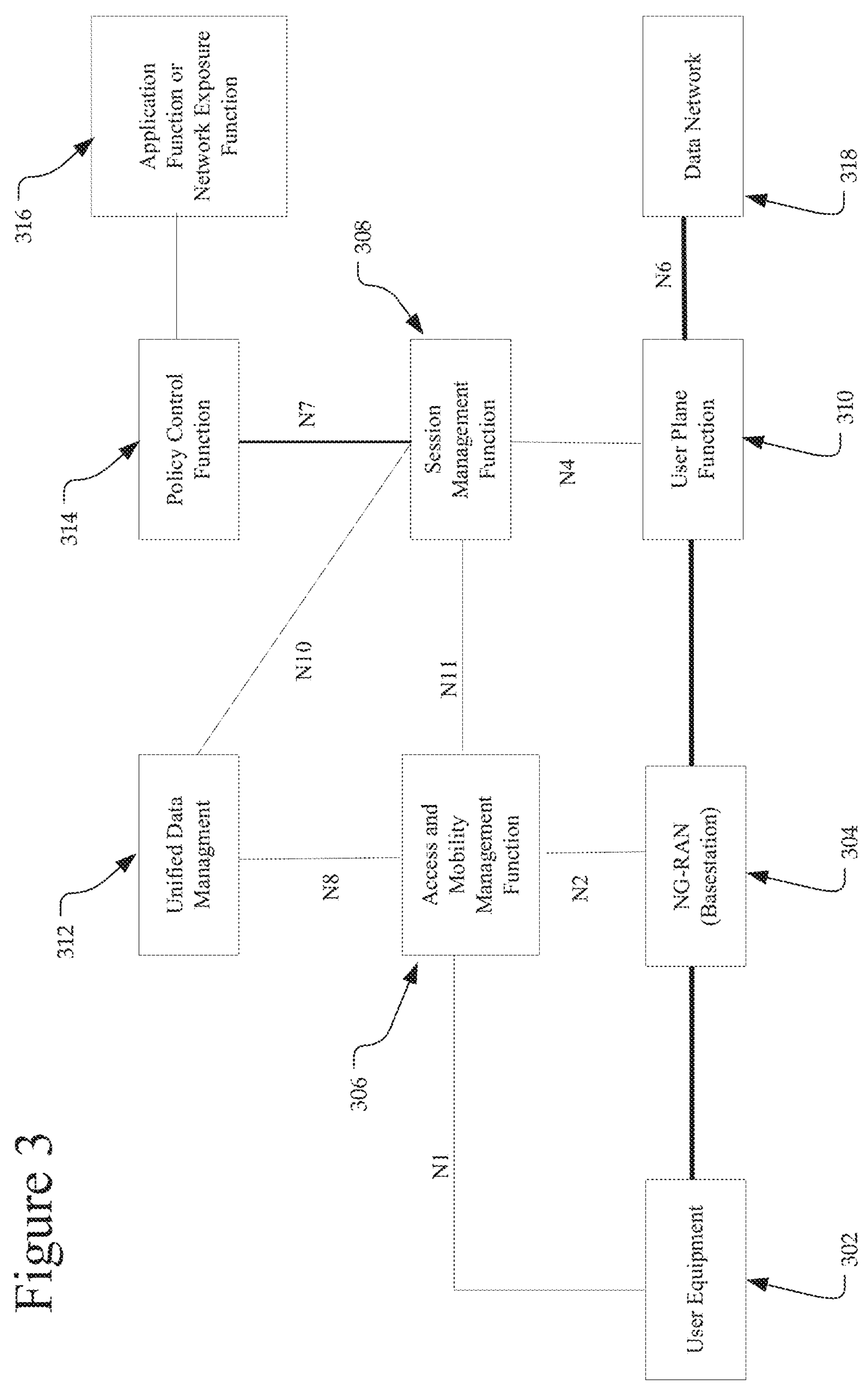
FIG. 3 shows an embodiment of a wireless network system architecture.
Figure 4:
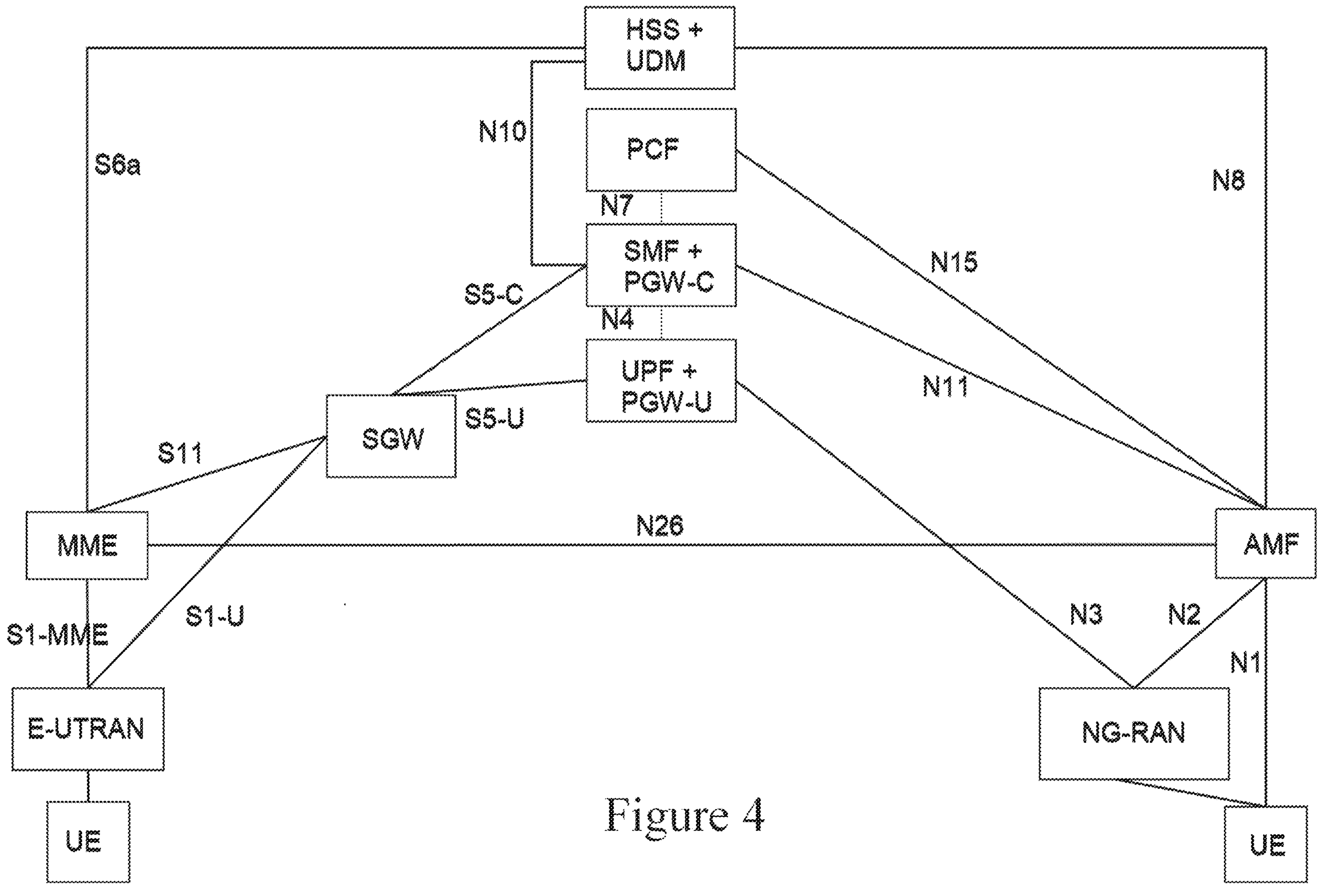
FIG. 4 shows an embodiment of a wireless network system architecture for network interworking.

The Radio Access Network (RAN) may be a part of a wireless communication system that connects UE devices to other parts of a network through radio or wireless connections. FIG. 1 illustrates an example NG-RAN or basestation. FIG. 2 illustrates an example random access messaging environment. FIGS. 3-4 illustrate an example architecture for interworking between network types. FIGS. 5-11 illustrate wireless communication examples for the security selection.

There may be multiple authentication methods (e.g. Transport Layer Security (TLS)) between an Edge Enabler Client (EEC) and an Edge Configuration Server (ECS), or EEC and Edge Enabler Server (EES). As described, there may be security mechanism selection between EEC and ECS/EES. During the packet data unit (PDU) session establishment procedure, UE that hosts EEC(s) receives ECS/EES authentication information (e.g. via Protocol Configuration Option (PCO)) and determines which to use. The ECS/EES authentication method information may include the authentication methods supported by ECS/EES and is included in protocol configuration option (PCO) information. During the PDU session establishment procedure, the UE that hosts EEC(s) receives ECS/EES authentication information via PCO and determines which to use. The SMF may not be aware of the internal structure of the authentication method information of EEC/EES.

When a user equipment ("UE") moves between network types, the security requirements may change. Specifically, the UE may move between different generations of networks, such as from a fourth generation network to a fifth generation network. For example, the UE may move from an Evolved Packet System (EPS) to 5GS or new radio (NR), an Access and Mobility Management Function (AMF) may use the mapped 5G security context constructed from the EPS security context to protect the subsequent messages. In some embodiments, this may not include a particular security key when switching between the networks. The authentication key may be a $K_{AUSF}$ key in one example. This particular key may be used for deriving other authentication keys. In the example above, the authentication key may be missing when moving from a fourth generation network to a fifth generation network, which may make interworking between the networks difficult. The authentication key may be generated in a fifth generation network, so the primary authentication procedure is triggered to derive the key. A home network triggered primary authentication mechanism is described for interworking from EPS to 5GS in one embodiment.

FIG. 1 shows an example basestation 102. The basestation 102 may also be referred to as a wireless network node or a next generation radio access network ("NG-RAN") node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

FIG. 3 shows one embodiment of a wireless network system architecture. This architecture is merely one example and there may be more or fewer components for implementing the embodiments described herein. The interconnections or communications between components are identified as N1, N2, N4, N6, N7, N8, N10, and N11, which may be referred to in the description or by other Figures. FIG. 2 illustrated an example user equipment ("UE") 104. UE 302 is a device accessing a wireless network (e.g. 5GS) and obtaining service via a NG-RAN node or basestation 304. The UE 302 interacts with an Access and Mobility Control Function ("AMF") 306 of the core network via NAS signaling. FIG. 1 illustrates an example basestation or NG-RAN 102. The NG-RAN node 304 is responsible for the air interface resource scheduling and air interface connection management of the network to which the UE accesses. The AMF 306 includes the following functionalities: Registration management, Connection management, Reachability management and Mobility Management. The AMF 306 also perform the access authentication and access authorization. The AMF 306 is the NAS security termination and relay the session management NAS between the UE 302 and the SMF 308, etc.

The SMF 308 includes the following functionalities: Session Management e.g. Session establishment, modify and release, UE IP address allocation & management (including optional Authorization), Selection and control of uplink function, downlink data notification, etc. The user plane function ("UPF") 310 includes the following functionalities: Anchor point for Intra-/Inter-RAT mobility, Packet routing & forwarding, Traffic usage reporting, QoS handling for user plane, downlink packet buffering and downlink data notification triggering, etc. The Unified Data Management ("UDM") 312 manages the subscription profile for the UEs. The subscription includes the data used for mobility management (e.g. restricted area), session management (e.g. QoS profile). The subscription data also includes slice selection parameters, which are used for AMF 306 to select a proper SMF 308. The AMF 306 and SMF 308 get the subscription from the UDM 312. The subscription data may be stored in a Unified Data Repository with the UDM 312, which uses such data upon reception of request from AMF 306 or SMF 308. The Policy Control Function ("PCF") 314 includes the following functionality: supporting unified policy framework to govern network behavior, providing policy rules to control plane function(s) to enforce the policy rule, and implementing a front end to access subscription information relevant for policy decisions in the User Data Repository. The Network Exposure Function ("NEF") 316 is deployed optionally for exchanging information with an external third party. In one embodiment, an Application Function ("AF") 316 may store the application information in the Unified Data Repository via NEF. The UPF 310 communicates with the data network 318.

FIG. 4 shows an embodiment of a wireless network system architecture for network interworking. FIG. 4 illustrates the fourth generation network (4G) on the left and the fifth generation (5G) network on the right. FIG. 4 represents the non-roaming architecture for interworking between 5GS and EPC or Evolved Universal Terrestrial Radio Access (E-UTRAN), which are examples of network types by which interworking is necessary for security, registration, and/or authentication. In this example, the AMF in 5G corresponds to MME in 4G and E-UTRAN in 4G corresponds NG-RAN (i.e. basestation) in 5G. The N26 interface is an inter-CN interface between the MME and 5GS AMF in order to enable interworking between EPC and the NG core. Support of N26 interface in the network may be optional for interworking. The N26 interface supports subset of the functionalities, which may be used for interworking and that are supported over S10. PGW-C+SMF and UPF+PGW-U are dedicated for interworking between 5GS and EPC, which may be optional and are based on UE MM Core Network Capability and UE subscription. UEs that are not subject to 5GS and EPC interworking may be served by entities not dedicated for interworking (i.e. by either by PGW or SMF/UPF). There may be another UPF (not shown) between the NG-RAN and the UPF+PGW-U. In some embodiments, the UPF+PGW-U can support N9 towards an additional UPF. There may be no assumption whether the SGW is deployed as a single SGW or as an SGW split based on its control-plane and user-plane functionality.

The 5G authentication and key agreement protocols provide increased home control. As described, authentication key support may be necessary for interworking between network types. The examples described herein are for a 5G authentication key that is supported in a 4G network type and authentication/registration that occurs for that support. This increased home control may include (in the example of EAP-AKA') the Authentication Server Function (AUSF) in the home network obtains confirmation that the UE has been successfully authenticated when the EAP-Response/AKA'-challenge received by the AUSF has been successfully verified. In another example, for 5G AKA, the AUSF in the home network obtains confirmation that the UE has been successfully authenticated when the authentication confirmation received by the AUSF in a request message (e.g. Nausf_UEAuthentication_Authenticate) has been successfully verified. When 3GPP credentials are used in the above examples, the result may be reported to the UDM. After the UDM is informed that the UE has been successfully authenticated or reauthenticated, the UDM may store the AUSF instance which reported the successful authentication. This may be an indicator that shows the UE has already done the authentication.

Figure 5:
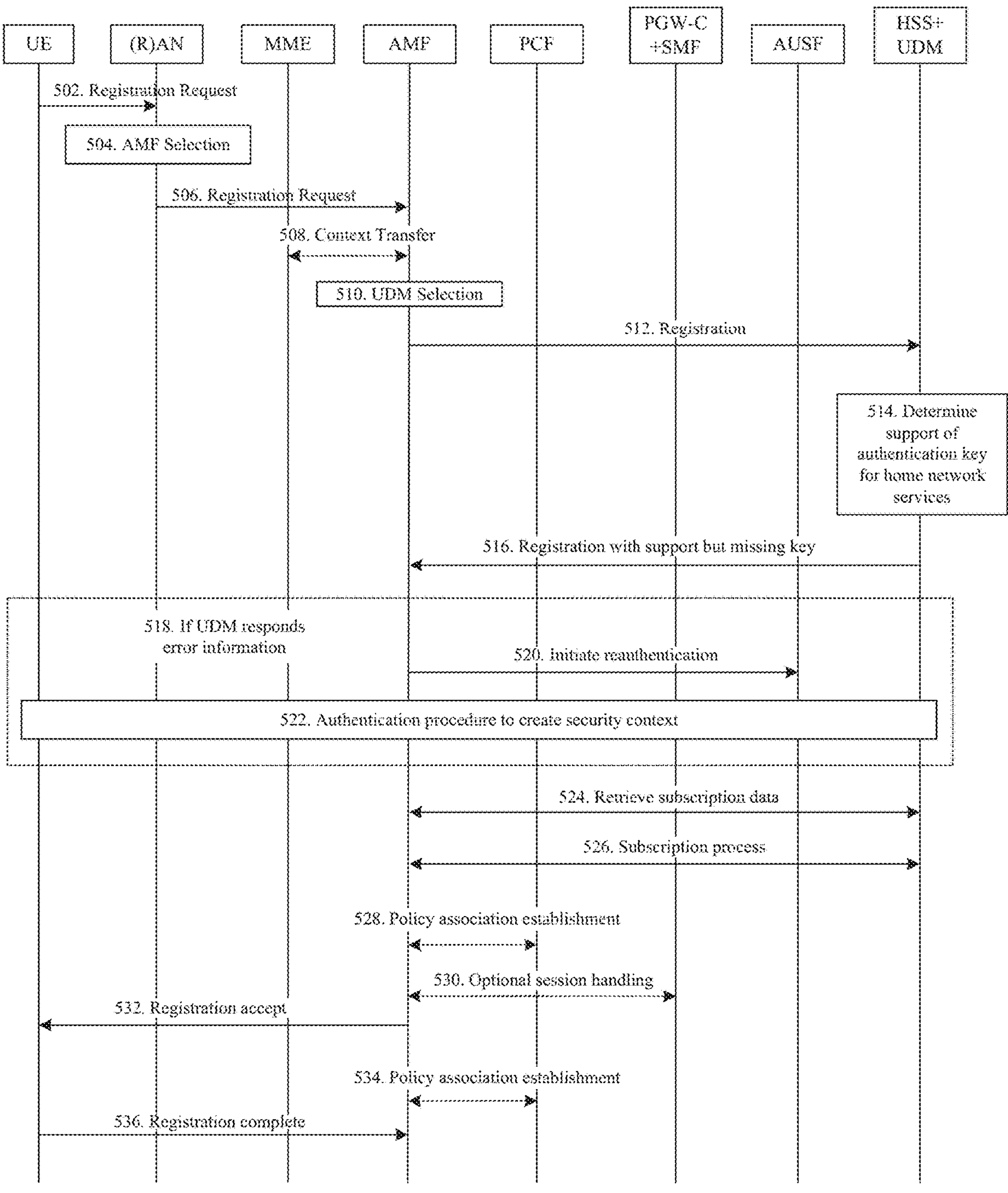
FIG. 5 shows an embodiment of a registration procedure for network interworking.

FIG. 5 shows an embodiment of a registration procedure for network interworking. This is an example embodiment for a registration procedure for EPS (i.e. 4G) to 5GS interworking over N26 interface. This is merely one example and the interworking may be between other network types. The registration procedure may be utilized for the interworking between network types. Some home network services may need an authentication key (e.g. $K_{AUSF}$ key). The UDM may check to see if it supports these network services.

In block 502, the UE sends a Registration Request with registration type set to "Mobility Registration Update." In other embodiments, the registration request may also be a service request. In block 504, the RAN may select an AMF. In block 506, the RAN transfers the Registration Request to the AMF. This Registration Request message between the RAN and the AMF may be an N2 message. In block 508, there may be a context transfer for IDLE mode mobility. Specifically, the AMF may send Context Request to MME and convert the received 4G/EPS MM Context into the 5GS MM Context. In block 510, the AMF, based on the SUPI, selects a UDM and the UDM may select a UDR instance.

In block 512, the AMF registers with the UDM using a registration request or message, such as Nudm_UECM_Registration. After this registration message, the UDM checks if it supports home network services requiring an authentication key in block 514. The authentication key may be $K_{AUSF}$ in one example. Example services that are checked for support include UPU, SoR and AKMA. The UDM may also check for the corresponding AUSF instance. In block 516, if the UDM supports the home network services but does not have an AUSF instance, it may reply error information to the AMF. In another example, rather than not having an AUSF instance it may not keep track of AUSF that stores the latest authentication key generated after successful completion of the latest primary authentication reported to the UDM. It replies error information to AMF and indicates AMF to initiate UE (re)authentication as in block 520. In one embodiment, the response may be a 403 Forbidden with the cause "REAUTHENTICATION_REQUIRED." In this embodiment, block 514 gives feedback that the instance is missing which may then trigger the registration of block 516.

If the UDM does not respond with error information in block 518, the registration would continue in block 524 and beyond. However, if the UDM does respond with error information in block 518, the AMF decides to initiate UE (re)authentication by invoking an AUSF as in block 520. In one embodiment, the AMF selects an AUSF based on UE identity and requests (re)authentication from the AUSF. In block 522, the authentication procedure between UE and 5GC continue to create a new native 5G security context. The UDM may store the AUSF instance which reported the successful authentication. In block 524, the AMF retrieves the Access and Mobility Subscription data, SMF Selection Subscription data, UE context in SMF data, and/or other information using a get request (e.g. Nudm_SDM_Get). In block 526, the AMF subscribes to be notified using a subscribe message (e.g. Nudm_SDM_Subscribe) when the data requested is modified. In one example, UDM may subscribe to UDR by a subscribe message (e.g. Nudr_DM_Subscribe). In block 528, AM Policy Association Establishment may be performed. In block 530, PDU session handling may be performed. In block 532, the AMF sends a Registration Accept message to the UE indicating that the Registration Request has been accepted. In block 534, the AMF may perform a policy association establishment, such as a UE Policy Association Establishment. In block 536, the UE sends a Registration Complete message to the AMF when it has successfully updated itself, and to acknowledge if/when a new 5G-GUTI was assigned.

Figure 6:
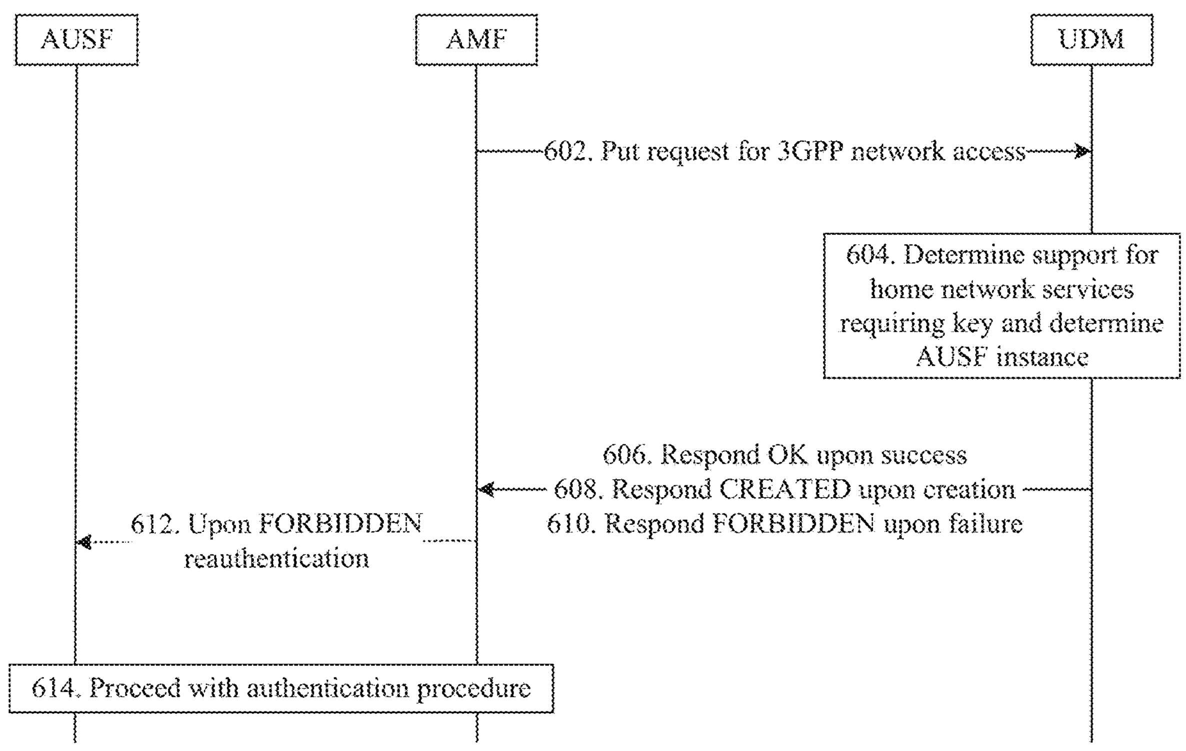
FIG. 6 shows another embodiment of the procedure in FIG. 5 with 3GPP access.

FIG. 6 shows another embodiment of the procedure in FIG. 5 with 3GPP access. FIG. 6 may include an alternative embodiment for the process shown in blocks 512-522 from FIG. 5. In this example, the registration/authentication procedure is for 3GPP access. The AMF sends a request to the UDM to update the AMF registration information for 3GPP access. The request may include the UE's identity (/{ueId}) which shall be a SUPI and the AMF Registration Information for 3GPP access. In block 602, the AMF sends a put request to the UDM. This put request may be for 3GPP network access. The PUT request may be to the resource representing the UE's AMF registration for 3GPP access to update or create AMF registration information. In block 604, the UDM checks if it supports home network services requiring an authentication key (e.g. $K_{AUSF}$). Example home network services include UPU, SoR and AKMA. In block 604, UDM may also check for the corresponding AUSF instance.

The determination made in block 604 could result in any of the responses shown in blocks 606-610. In block 606, upon success, the UDM updates the Amf3GppAccessRegistration resource by replacing it with the received resource information, and responds with "200 OK" or "204 No Content." In block 608, if the resource does not exist, it may respond with CREATED upon the creation. In this example, there may not be a previous AMF information stored in UDM for that user. The UDM stores the received AMF registration data for 3GPP access and responds with HTTP Status Code "201 created". A response body may be included to convey additional information to the NF consumer (e.g., features supported by UDM). In block 610, the UDM responds with FORBIDDEN upon a failure state. If the UDM supports the home network services but does not have the AUSF instance (or does not keep track of AUSF that stores the latest authentication key generated after successful completion of the latest primary authentication reported to the UDM), it may respond with 403 Forbidden with the cause REAUTHENTICATION_REQUIRED. In one embodiment, if the operation cannot be authorized (e.g. due to UE not having the required subscription data), the AMF does not support CAG feature and the UE is allowed to access 5GS via CAG cell(s) only, access barring, roaming restrictions or core network restriction, HTTP status code "403 Forbidden" should be returned including additional error information in the response body (e.g. in a "ProblemDetails" element). In block 612, when the block 610 responds FORBIDDEN, the AMF initiates UE (re)authentication by invoking an AUSF. In block 614, the authentication procedure continues. Specifically, the authentication procedure between UE and 5GC may be performed to create a new native 5G security context. The UDM may store the AUSF instance which reported the successful authentication.

Figure 7:
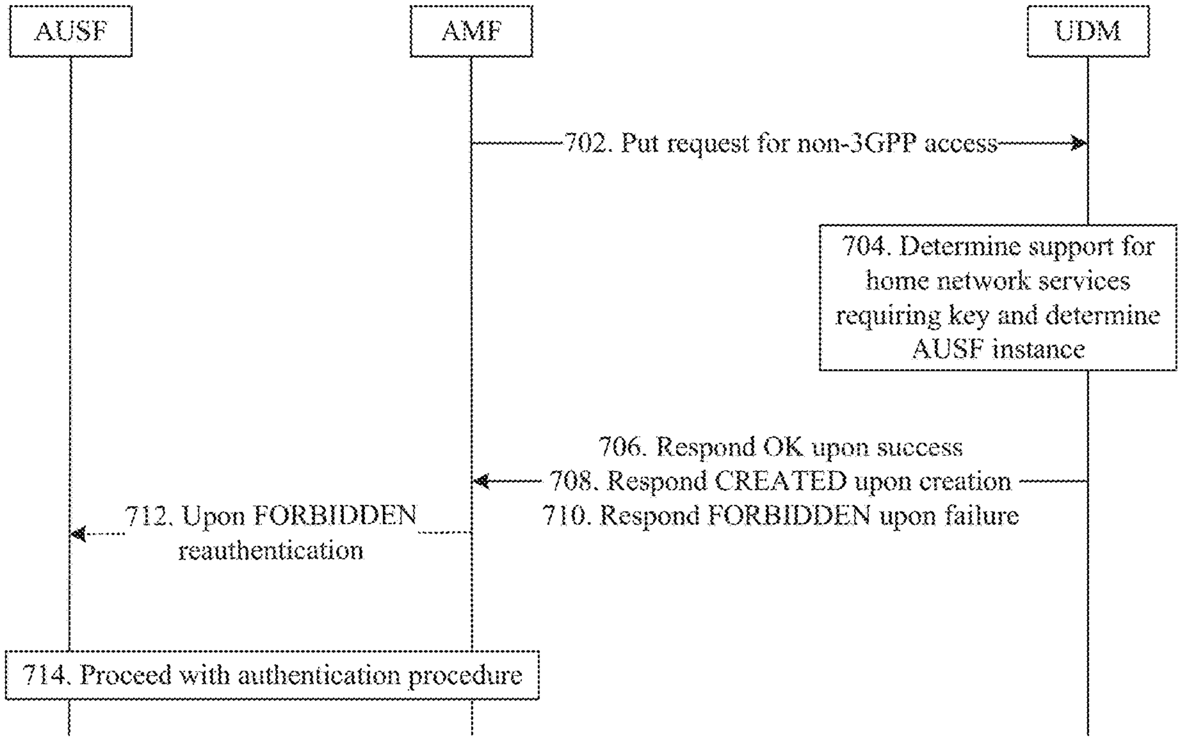
FIG. 7 shows another embodiment of the procedure in FIG. 5 with non-3GPP access.

FIG. 7 shows another embodiment of the procedure in FIG. 5 with non-3GPP access. FIG. 7 may include an alternative embodiment for the process shown in blocks 512-522 from FIG. 5. In this example, the registration/authentication procedure is for non-3GPP access. The AMF sends a request to the UDM to update the AMF registration information for non-3GPP access. In block 702, the AMF sends a put request to the UDM. This put request may be for non-3GPP network access to update or create AMF registration information. In block 704, the UDM checks if it supports home network services requiring an authentication key (e.g. $K_{AUSF}$). Example home network services include UPU, SoR and AKMA. In block 704, UDM may also check for the corresponding AUSF instance.

The determination made in block 704 could result in any of the responses shown in blocks 706-710. In block 706, upon success, the UDM updates the AmfNon3GppAccessRegistration resource by replacing it with the received resource information, and responds with "200 OK" or "204 No Content." In block 708, if the resource does not exist, it may respond with CREATED upon the creation. In this example, there may not be a previous AMF information stored in UDM for that user. The UDM stores the received AMF registration data for 3GPP access and responds with HTTP Status Code "201 created". A response body may be included to convey additional information to the NF consumer (e.g., features supported by UDM). In block 710, the UDM responds with FORBIDDEN upon a failure state. If the UDM supports the home network services but does not have the AUSF instance (or does not keep track of AUSF that stores the latest authentication key generated after successful completion of the latest primary authentication reported to the UDM), it may respond with 403 Forbidden with the cause REAUTHENTICATION_REQUIRED. In one embodiment, if the operation cannot be authorized (e.g. due to UE not having the required subscription data), the AMF does not support CAG feature and the UE is allowed to access 5GS via CAG cell(s) only, access barring, roaming restrictions or core network restriction, HTTP status code "403 Forbidden" should be returned including additional error information in the response body (e.g. in a "ProblemDetails" element). In block 712, when the block 710 responds FORBIDDEN, the AMF initiates UE (re)authentication by invoking an AUSF. In block 714, the authentication procedure continues. Specifically, the authentication procedure between UE and 5GC may be performed to create a new native 5G security context. The UDM may store the AUSF instance which reported the successful authentication.

Figure 8:
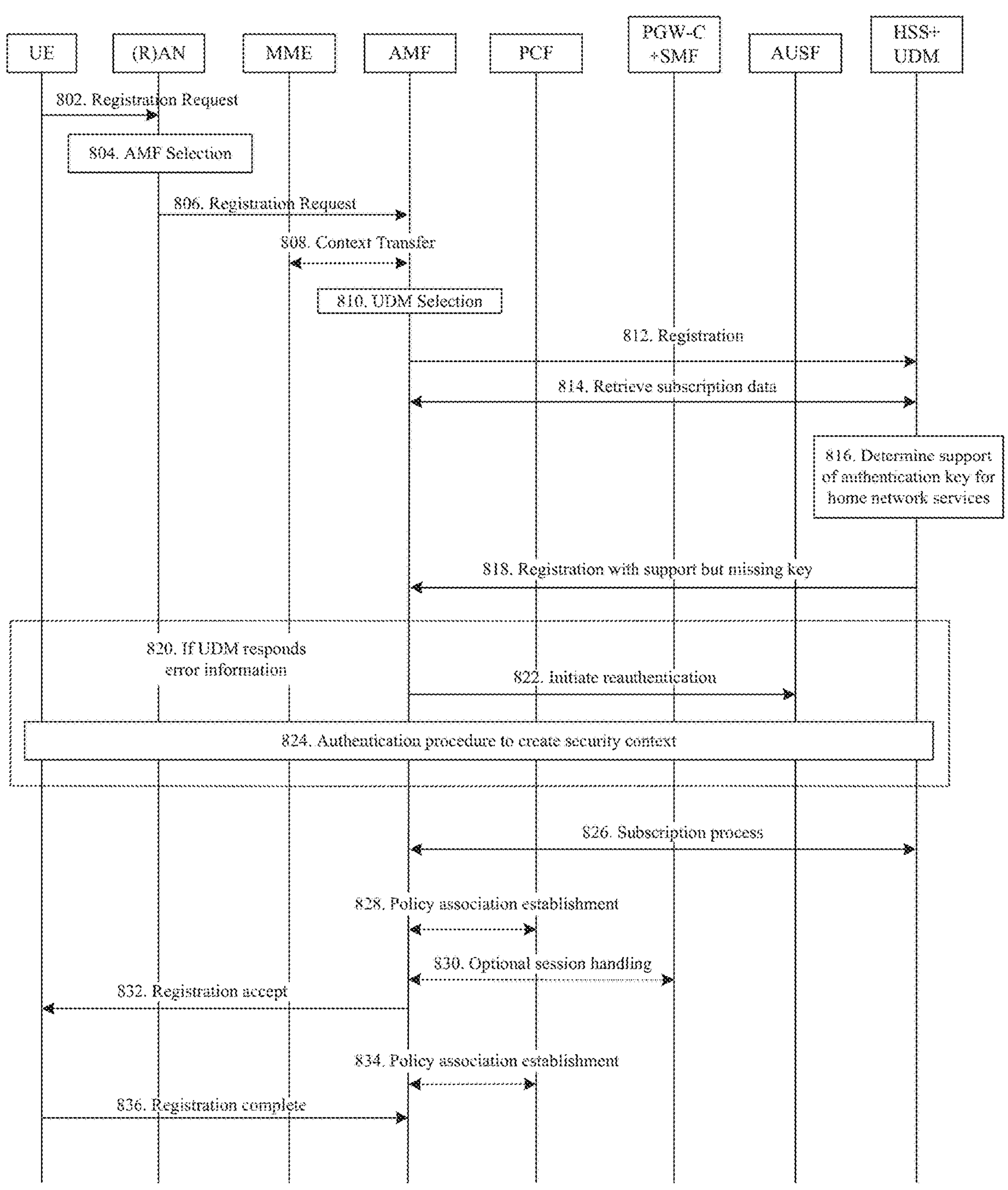
FIG. 8 shows another embodiment of a registration procedure for network interworking.

FIG. 8 shows another embodiment of a registration procedure for network interworking. In this embodiment, the registration procedure is different. Specifically, the get request retrieving of subscription data in block 526 of FIG. 5 is after the registration in block 512 and this get request triggers the determination for the embodiment in FIG. 8. This is a registration procedure for EPS to 5GS inter working over N26 interface. This is merely one example and the interworking may be between other network types. The registration procedure may be utilized for the interworking between network types. Some home network services may need an authentication key (e.g. $K_{AUSF}$ key). The UDM may check to see if it supports these network services.

In block 802, the UE sends a Registration Request with registration type set to "Mobility Registration Update." In other embodiments, the registration request may also be a service request. In block 804, the RAN may select an AMF. In block 806, the RAN transfers the Registration Request to the AMF. This Registration Request message between the RAN and the AMF may be an N2 message. In block 808, there may be a context transfer for IDLE mode mobility. Specifically, the AMF may send Context Request to MME and convert the received 4G/EPS MM Context into the 5GS MM Context. In block 810, the AMF, based on the SUPI, selects a UDM and the UDM may select a UDR instance.

In block 812, the AMF registers with the UDM using a registration request or message, such as Nudm_UECM_Registration. In block 814, the AMF retrieves the Access and Mobility Subscription data, SMF Selection Subscription data, UE context in SMF data, and/or other information using a get request (e.g. Nudm_SDM_Get). After this get request, the UDM checks if it supports home network services requiring an authentication key in block 816. The authentication key may be $K_{AUSF}$ in one example. Example services that are checked for support include UPU, SoR and AKMA. The UDM may also check for the corresponding AUSF instance. In block 820, if the UDM supports the home network services but does not have an AUSF instance, it may reply error information to the AMF. In another example, rather than not having an AUSF instance it may not keep track of AUSF that stores the latest authentication key generated after successful completion of the latest primary authentication reported to the UDM. It replies error information to AMF and indicates AMF to initiate UE (re) authentication as in block 822. In one embodiment, the response may be a 403 Forbidden with the cause "REAUTHENTICATION_REQUIRED." In this embodiment, block 816 gives feedback that the instance is missing which may then trigger the registration of block 818.

If the UDM does not respond with error information in block 816, the registration would continue in block 826 and beyond. However, if the UDM does respond with error information in block 816, the AMF decides to initiate UE (re)authentication by invoking an AUSF as in block 822. In one embodiment, the AMF selects an AUSF based on UE identity and requests (re)authentication from the AUSF. In block 824, the authentication procedure between UE and 5GC continue to create a new native 5G security context. The UDM may store the AUSF instance which reported the successful authentication.

In block 826, the AMF subscribes to be notified using a subscribe message (e.g. Nudm_SDM_Subscribe) when the data requested is modified. In one example, UDM may subscribe to UDR by a subscribe message (e.g. Nudr_DM_Subscribe). In block 828, AM Policy Association Establishment may be performed. In block 830, PDU session handling may be performed. In block 832, the AMF sends a Registration Accept message to the UE indicating that the Registration Request has been accepted. In block 834, the AMF may perform a policy association establishment, such as a UE Policy Association Establishment. In block 836, the UE sends a Registration Complete message to the AMF when it has successfully updated itself, and to acknowledge if/when a new 5G-GUTI was assigned.

Figure 9:
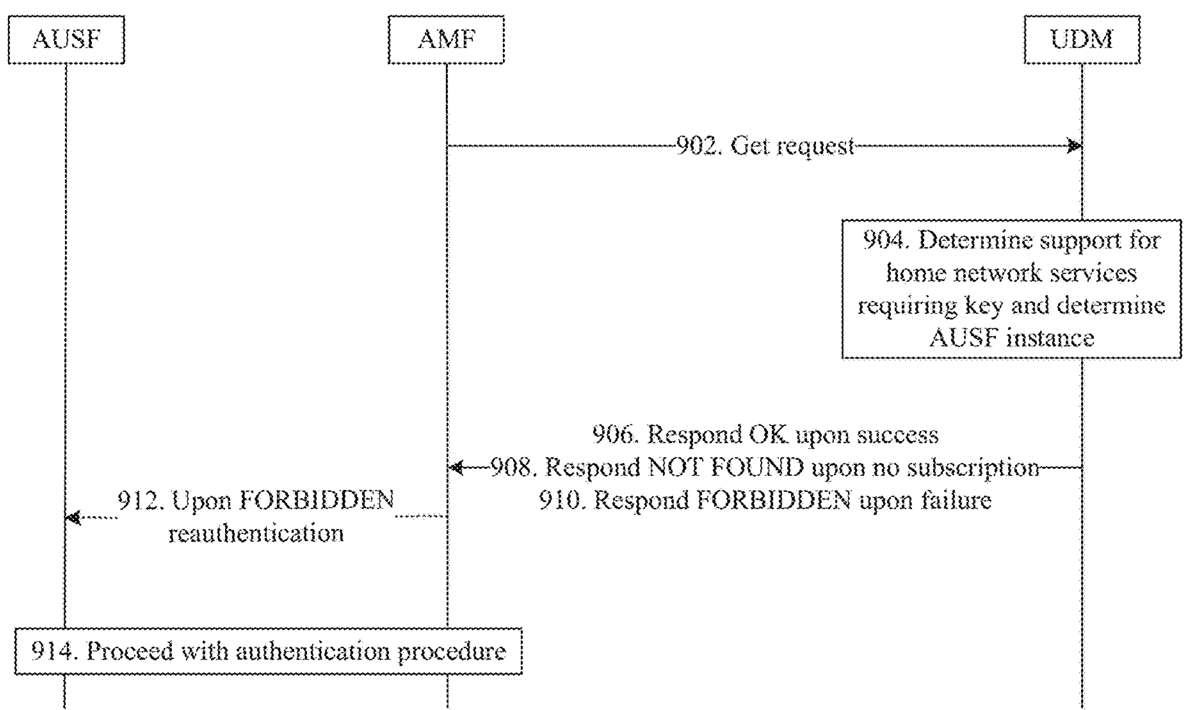
FIG. 9 shows another embodiment of the procedure in FIG. 8 with subscription data

FIG. 9 shows another embodiment of the procedure in FIG. 8 with subscription data FIG. 9 may include an alternative embodiment for the process shown in blocks 814-824 from FIG. 8. In this example, the registration/authentication procedure including requesting a UE's Access and Mobility Subscription Data. The NF service consumer (e.g. AMF) sends a request to the UDM to receive the UE's Access and Mobility Subscription data in block 902. The request may include the UE's identity (/{supi}), the type of the requested information (/am-data) and query parameters (supported-features, plmn-id). This get request may be to update or create AMF registration information. In block 904, the UDM checks if it supports home network services requiring an authentication key (e.g. KAUSF). Example home network services include UPU, SoR and AKMA. In block 904, UDM may also check for the corresponding AUSF instance.

The determination made in block 904 could result in any of the responses shown in blocks 906-910. In block 906, upon success, the UDM updates the resource by replacing it with the received resource information, and responds with "200 OK" or "204 No Content." The message body may include the UE's Access and Mobility Subscription Data as relevant for the requesting NF service consumer.

If there is no valid subscription data for the UE, HTTP status code "404 Not Found" may be returned including additional error information in the response body (in the "ProblemDetails" element) for block 908. In this example, there may not be a previous AMF information stored in UDM for that user. In block 910, the UDM responds with FORBIDDEN upon a failure state. If the UDM supports the home network services but does not have the AUSF instance (or does not keep track of AUSF that stores the latest authentication key generated after successful completion of the latest primary authentication reported to the UDM), it may respond with 403 Forbidden with the cause REAUTHENTICATION_REQUIRED. In one embodiment, if the operation cannot be authorized (e.g. due to UE not having the required subscription data), the AMF does not support CAG feature and the UE is allowed to access 5GS via CAG cell(s) only, access barring, roaming restrictions or core network restriction, HTTP status code "403 Forbidden" should be returned including additional error information in the response body (e.g. in a "ProblemDetails" element). In block 912, when the block 910 responds FORBIDDEN, the AMF initiates UE (re)authentication by invoking an AUSF. In block 914, the authentication procedure continues. Specifically, the authentication procedure between UE and 5GC may be performed to create a new native 5G security context. The UDM may store the AUSF instance which reported the successful authentication.

Figure 10:
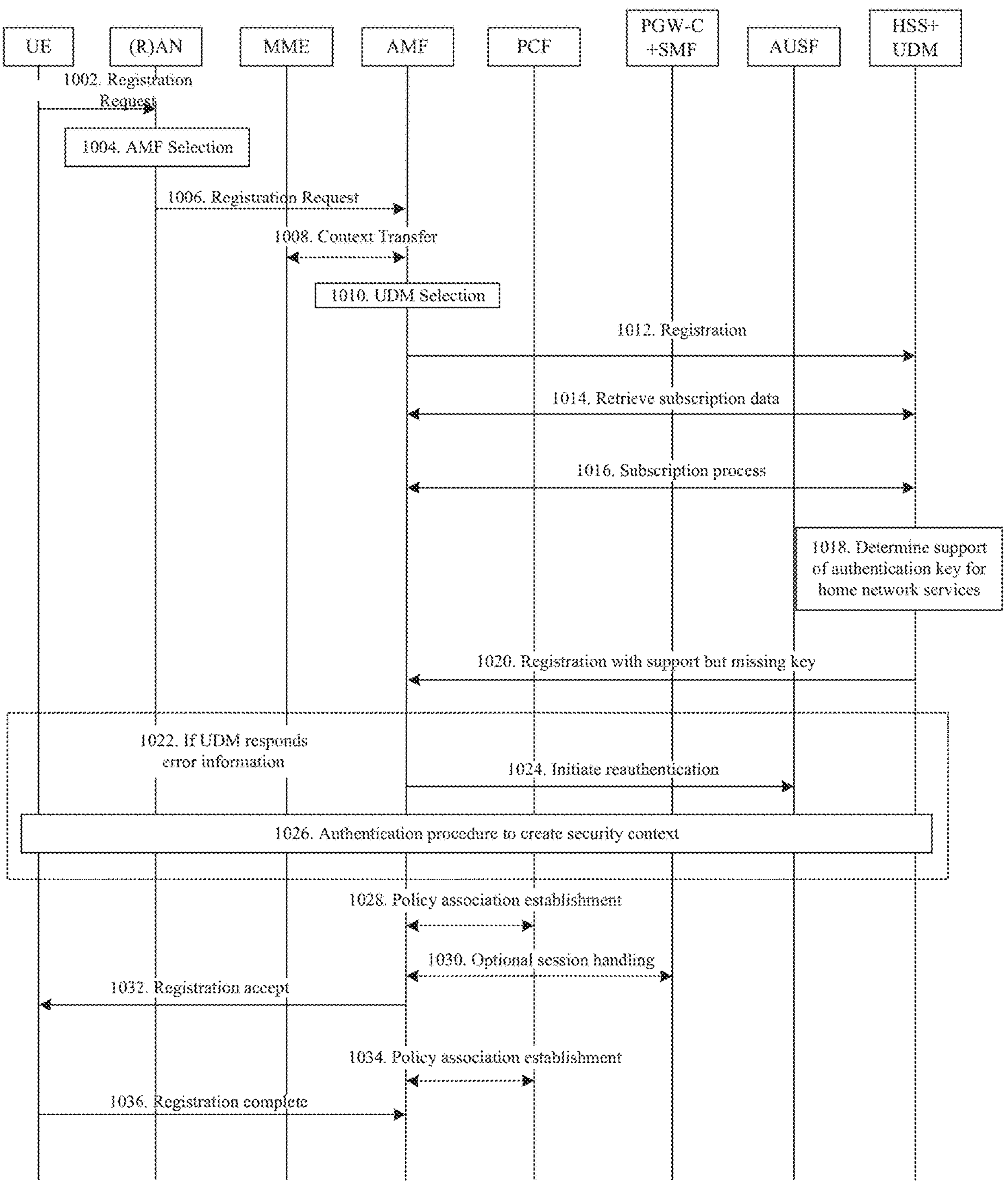
FIG. 10 shows another embodiment of a registration procedure for network interworking.

FIG. 10 shows another embodiment of a registration procedure for network interworking. In this embodiment, the registration procedure is different. Specifically, the subscription process in block 526 of FIG. 5 triggers the determination for the embodiment in FIG. 10. This is a registration procedure for EPS to 5GS inter working over N26 interface. This is merely one example and the interworking may be between other network types. The registration procedure may be utilized for the interworking between network types. Some home network services may need an authentication key (e.g. $K_{AUSF}$ key). The UDM may check to see if it supports these network services.

In block 1002, the UE sends a Registration Request with registration type set to "Mobility Registration Update." In other embodiments, the registration request may also be a service request. In block 1004, the RAN may select an AMF. In block 1006, the RAN transfers the Registration Request to the AMF. This Registration Request message between the RAN and the AMF may be an N2 message. In block 1008, there may be a context transfer for IDLE mode mobility. Specifically, the AMF may send Context Request to MME and convert the received 4G/EPS MM Context into the 5GS MM Context. In block 1010, the AMF, based on the SUPI, selects a UDM and the UDM may select a UDR instance. In block 1012, the AMF registers with the UDM using a registration request or message, such as Nudm_UECM_Registration.

In block 1014, the AMF retrieves the Access and Mobility Subscription data, SMF Selection Subscription data, UE context in SMF data, and/or other information using a get request (e.g. Nudm_SDM_Get). In block 1016, the AMF subscribes to be notified using a subscribe message (e.g. Nudm_SDM_Subscribe) when the data requested is modified. In one example, UDM may subscribe to UDR by a subscribe message (e.g. Nudr_DM_Subscribe). The subscription process in block 1016 triggers the determination process.

After this message, the UDM checks if it supports home network services requiring an authentication key in block 1018. The authentication key may be $K_{AUSF}$ in one example. Example services that are checked for support include UPU, SoR and AKMA. The UDM may also check for the corresponding AUSF instance. In block 1022, if the UDM supports the home network services but does not have an AUSF instance, it may reply error information to the AMF. In another example, rather than not having an AUSF instance it may not keep track of AUSF that stores the latest authentication key generated after successful completion of the latest primary authentication reported to the UDM. It replies error information to AMF and indicates AMF to initiate UE (re)authentication as in block 1024. In one embodiment, the response may be a 403 Forbidden with the cause "REAUTHENTICATION_REQUIRED." In this embodiment, block 1018 gives feedback that the instance is missing which may then trigger the registration of block 1020.

If the UDM does not respond with error information in block 1018, the registration would continue in block 1026 and beyond. However, if the UDM does respond with error information in block 1018, the AMF decides to initiate UE (re)authentication by invoking an AUSF as in block 1024. In one embodiment, the AMF selects an AUSF based on UE identity and requests (re)authentication from the AUSF. In block 1026, the authentication procedure between UE and 5GC continue to create a new native 5G security context. The UDM may store the AUSF instance which reported the successful authentication.

In block 1028, AM Policy Association Establishment may be performed. In block 1030, PDU session handling may be performed. In block 1032, the AMF sends a Registration Accept message to the UE indicating that the Registration Request has been accepted. In block 1034, the AMF may perform a policy association establishment, such as a UE Policy Association Establishment. In block 1036, the UE sends a Registration Complete message to the AMF when it has successfully updated itself, and to acknowledge if/when a new 5G-GUTI was assigned.

Figure 11:
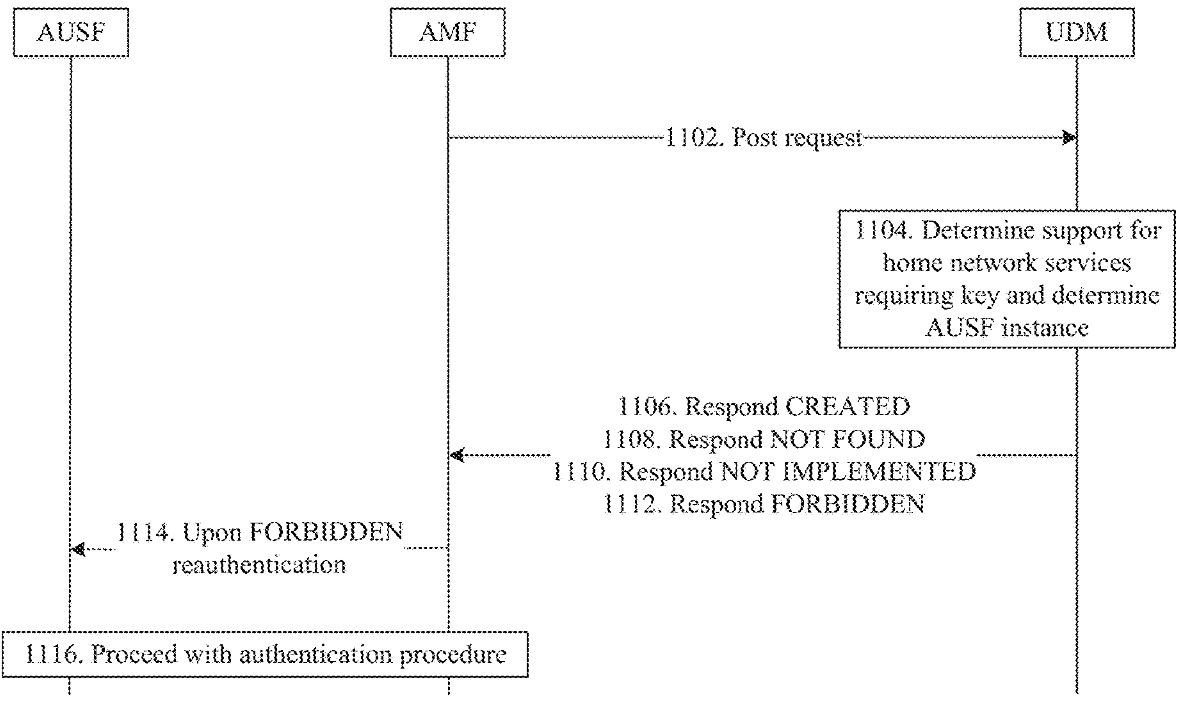
FIG. 11 shows another embodiment of the procedure in FIG. 10 with a subscription request.

FIG. 11 shows another embodiment of the procedure in FIG. 10 with a subscription request. FIG. 11 may include an alternative embodiment for the process shown in blocks 1016-1026 from FIG. 10. In this example, the registration/authentication procedure including requesting a UE's Access and Mobility Subscription Data. The NF service consumer (e.g. AMF) sends a Post request in block 1102. The Post request is to the parent resource (collection of subscriptions) ( . . . /{ueId}/sdm-subscriptions), to create a subscription as present in message body. The payload body of the Post request shall contain a representation of the individual subscription resource to be created. There shall be only one subscription per UE per NF service consumer identified by the ueId in URI and NfInstanceId in SdmSubscription. In block 1104, the UDM checks if it supports home network services requiring an authentication key (e.g. KAUSF). Example home network services include UPU, SoR and AKMA. In block 1104, UDM may also check for the corresponding AUSF instance.

The determination made in block 1104 could result in any of the responses shown in blocks 1106-1112. On success, the UDM responds with "Created" with the message body containing a representation of the created subscription in block 1106. The Location HTTP header may include the URI of the created subscription. In an alternative for block 1106, in case of partial success, the "Created" message includes the monitors resource Uris that are supported by the UDM. In block 1108, if there is no valid subscription data for the UE, HTTP status code "Not Found" may be returned including additional error information in the response body (in the "ProblemDetails" element). In block 1110, if the UE subscription data exists, but the requested subscription to data change notification cannot be created (e.g. due to an invalid/unsupported data reference to be monitored, contained in the SdmSubscription parameter), HTTP status code "Not Implemented" may be returned including additional error information in the response body (in the "ProblemDetails" element).

In block 1112, the UDM responds with FORBIDDEN upon a failure state. If the UDM supports the home network services but does not have the AUSF instance (or does not keep track of AUSF that stores the latest authentication key generated after successful completion of the latest primary authentication reported to the UDM), it may respond with 403 Forbidden with the cause REAUTHENTICATION_REQUIRED. In one embodiment, if the operation cannot be authorized (e.g. due to UE not having the required subscription data), the AMF does not support CAG feature and the UE is allowed to access 5GS via CAG cell(s) only, access barring, roaming restrictions or core network restriction, HTTP status code "403 Forbidden" should be returned including additional error information in the response body (e.g. in a "ProblemDetails" element). In block 1114, when the block 1112 responds FORBIDDEN, the AMF initiates UE (re)authentication by invoking an AUSF. In block 1116, the authentication procedure continues. Specifically, the authentication procedure between UE and 5GC may be performed to create a new native 5G security context. The UDM may store the AUSF instance which reported the successful authentication.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A wireless communication method comprising:

receiving, by a Unified Data Management (UDM) from an access and mobility management function (AMF), a message;

after receiving the message, determining, by the UDM, whether there is an Authentication Server Function (AUSF) instance identification (ID) stored in the UDM;

after the determining:

in response to the determining comprising determining that there is no AUSF instance ID stored in the UDM, responding, by the UDM to the AMF, by indicating to initiate reauthentication; and in response to the determining comprising determining that the AUSF instance ID is stored in the UDM, continuing, by the UDM, registration.

2. The method of claim 1, wherein the message comprises one:

a request to retrieve registration information; or a request to subscribe to registration information.

3. The method of claim 1, wherein, when there is no AUSF instance ID, the method further comprising:

responding, by the UDM to the AMF, with error information to initiate the reauthentication.

4. The method of claim 3, wherein the error information comprises a 403 Forbidden with a cause comprising REAUTHENTICATION_REQUIRED.

5. The method of claim 1, further comprising:
storing, by the UDM, an AUSF instance upon the reauthentication being successful.

6. The method of claim 1, wherein a Subscriber Permanent Identifier (SUPI) is included in the message.

7. The method of claim 1, further comprising:
completing authentication between a user equipment (UE) and a 5G core network (5GC) for new radio (NR) security.

8. A wireless communications apparatus comprising:
a memory storing a plurality of instructions; and
a processor configured to execute the plurality of instructions, and upon execution of the plurality of instructions, is configured to cause a Unified Data Management (UDM) to:
receive, from an access and mobility management function (AMF), a message;
after receipt of the message, determine whether there is an Authentication Server Function (AUSF) instance identification (ID) stored in the UDM;
after the determination:
in response to the determination comprising a determination that there is no AUSF instance ID stored in the UDM, respond to the AMF by indicating to initiate reauthentication; and
in response to the determination comprising a determination that the AUSF instance ID is stored in the UDM, continue registration.

9. The apparatus of claim 8, wherein the message comprises one:
a request to retrieve registration information; or
a request to subscribe to registration information.

10. The apparatus of claim 8, wherein, when there is no AUSF instance ID, the processor, upon execution of the plurality of instructions, is further configured to cause the UDM to:
respond to the AMF with error information to initiate the reauthentication.

11. The apparatus of claim 8, wherein the processor, upon execution of the plurality of instructions, is further configured to cause the UDM to:
store an AUSF instance upon the reauthentication being successful.

12. The apparatus of claim 8, wherein a Subscriber Permanent Identifier (SUPI) is included in the message.

13. The apparatus of claim 8, wherein the processor, upon execution of the plurality of instructions, is further configured to cause the UDM to:
complete authentication between a user equipment (UE) and a 5G core network (5GC) for new radio (NR) security.

14. A wireless communication method comprising:
transmitting, by an access and mobility management function (AMF), a message to a Unified Data Management (UDM);
in response to a determination by the UDM that an Authentic Server Function, AUSF, instance identification, ID, is stored in the UDM, continuing, by the AMF, registration; and
in response to a determination by the UDM that there is no AUSF instance ID stored in the UDM, receiving, by the AMF from the UDM, a response to initiate reauthentication.

15. The method of claim 14, wherein the message comprises one of:
a request to retrieve registration information; or
a request to subscribe to registration information.

16. The method of claim 14, wherein, when there is no AUSF instance ID, the method further comprises: receiving, by the AMF from the UDM, error information to initiate the reauthentication.

17. The method of claim 16, wherein the error information comprises a 403 Forbidden with a cause comprising REAUTHENTICATION_REQUIRED.

18. The method of claim 14, further comprising:
performing, by the AMF, the reauthentication.

19. The method of claim 14, wherein a Subscriber Permanent Identifier (SUPI) is included in the message.

20. The method of claim 19, further comprising:
selecting, by the AMF, an AUSF based on the SUPI.

* * * * *